United States Patent
Schneider

[11] Patent Number: 6,039,156
[45] Date of Patent: Mar. 21, 2000

[54] SLIDE PIN BUSHING FOR DISC BRAKE ASSEMBLY

[75] Inventor: Daniel P. Schneider, Plymouth, Mich.

[73] Assignee: Kelsey Hayes Company, Livonia, Mich.

[21] Appl. No.: 08/877,685

[22] Filed: Jun. 17, 1997

[51] Int. Cl.[7] ..................................... F16D 65/14
[52] U.S. Cl. .......................................... 188/73.44
[58] Field of Search ............................. 188/73.44, 73.32, 188/73.41, 73.42, 73.31, 73.45; 277/587, 636, 637

[56] References Cited

U.S. PATENT DOCUMENTS

| | | | |
|---|---|---|---|
| 3,642,268 | 2/1972 | Hipsher | 267/281 |
| 4,151,899 | 5/1979 | Wright | 188/73.38 |
| 4,194,597 | 3/1980 | Evans et al. | 188/73.38 |
| 4,199,159 | 4/1980 | Evans | 277/636 |
| 4,200,173 | 4/1980 | Evans et al. | 188/73.45 |
| 4,220,223 | 9/1980 | Rinker et al. | 188/73.1 |
| 4,228,726 | 10/1980 | Rinker et al. | 92/168 |
| 4,261,443 | 4/1981 | Wright | 188/73.39 |
| 4,308,938 | 1/1982 | Denton | 188/73.45 |
| 4,327,925 | 5/1982 | Alexander et al. | 277/636 |
| 4,331,221 | 5/1982 | Evans et al. | |
| 4,504,044 | 3/1985 | Shtarkman | 267/35 |
| 4,509,730 | 4/1985 | Shtarkman | 267/35 |

*Primary Examiner*—Christopher P. Schwartz
*Assistant Examiner*—Melanie Talavera
*Attorney, Agent, or Firm*—MacMillian, Sobanski, & Todd, LLC

[57] ABSTRACT

A slide pin bushing for use in a vehicle disc brake caliper assembly adapted to selectively frictionally engage a rotor connected to a vehicle wheel includes an anchor plate adapted to be secured to a stationary component of the vehicle, and a caliper secured to the anchor plate for sliding movement relative thereto. A pair of brake pads are carried by the disc brake caliper assembly, and an actuation system is provided for selectively moving the brake pads axially toward and away from one another so as to selectively frictionally engage the rotor. An elastomeric slide pin bushing is disposed in a non-threaded opening formed in the caliper. The slide pin bushing includes a pair of opposed ends and an intermediate body section. The intermediate body section of the slide pin bushing is provided with a cylindrical inner surface having a generally roughened textured surface finish. A generally rigid sleeve is disposed within the slide pin bushing. The sleeve includes an outer surface which engages the roughened or textured surface finish of the cylindrical inner surface of the slide pin bushing. A pin extends through the sleeve to secure the caliper to the anchor plate for sliding movement relative thereto.

19 Claims, 5 Drawing Sheets

SLIDE PIN BUSHING FOR DISC BRAKE ASSEMBLY

BACKGROUND OF THE INVENTION

This invention relates in general to vehicle disc brake assemblies and in particular to an improved structure for a slide pin bushing adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. A caliper assembly is slidably supported by pins secured to an anchor plate. The anchor plate is secured to a non-rotatable component of the vehicle, such as the steering knuckle or axle flange. The caliper assembly includes a pair of brake pads which are disposed on opposite sides of the rotor. The brake pads are operatively connected to one or more hydraulically actuated pistons for movement between a non-braking position, wherein they are spaced apart from opposed braking surfaces of the rotor, and a braking position, wherein they are moved into frictional engagement with the opposed braking surfaces of the rotor. When the operator of the vehicle depresses the brake pedal, the piston urges the brake pads from the non-braking position to the braking position so as to frictionally engage the opposed braking surfaces of the rotor and thereby slow or stop the rotation of the associated wheel of the vehicle.

As mentioned above, the caliper assembly is slidably supported on pins secured to the anchor plate. A typical pin includes a non-threaded main body and threaded end. The main body of the pin extends into a non-threaded opening formed in the inboard leg of the caliper, and the threaded end of the pin is received in a threaded opening provided in the anchor plate. Since the pins slidably support the caliper assembly relative to the anchor plate, it is important that the caliper assembly is sufficiently supported by the pins while still being able to freely slide. Thus, it is known to provide the disc brake assembly with a hollow cylindrical metal sleeve or bushing which is disposed in the non-threaded opening of the inboard leg of the caliper about the non-threaded main body of the pin. Also, in order to prevent debris from entering, a rubber slide pin bushing is disposed in the non-threaded opening formed in the inboard leg of the caliper about the outer diameter of the metal sleeve. U.S. Pat. No. 4,331,221 to Evans discloses such a known pin, slide pin bushing, and metal sleeve for use in a disc brake assembly.

BRIEF SUMMARY OF THE INVENTION

This invention relates to an improved structure for a slide pin bushing for use in a vehicle disc brake caliper assembly adapted to selectively frictionally engage a rotor connected to a vehicle wheel. The disc brake assembly includes an anchor plate adapted to be secured to a stationary component of the vehicle and a caliper secured to the anchor plate for sliding movement relative thereto. A pair of brake pads are carried by the disc brake caliper assembly, and an actuation means is provided for selectively moving the brake pads axially toward and away from one another so as to selectively frictionally engage the rotor. An elastomeric slide pin bushing is disposed in a non-threaded opening formed in the caliper. The slide pin bushing includes a pair of opposed ends and an intermediate body section. The intermediate body section of the slide pin bushing is provided with a cylindrical inner surface having a generally roughened or textured surface finish. A generally rigid sleeve is disposed within the slide pin bushing. The sleeve includes an outer surface which engages the roughened textured surface finish of the cylindrical inner surface of the slide pin bushing. A pin extends through the sleeve to secure the caliper to the anchor plate for sliding movement relative thereto.

Various objects and advantages of this invention will become apparent to those skilled in the art from the following detailed description of the preferred embodiment, when read in light of the accompanying drawings.

BRIEF DESCRIPTION OF THE SEVERAL VIEWS OF DRAWINGS

DETAILED DESCRIPTION OF THE INVENTION

Figure 1:
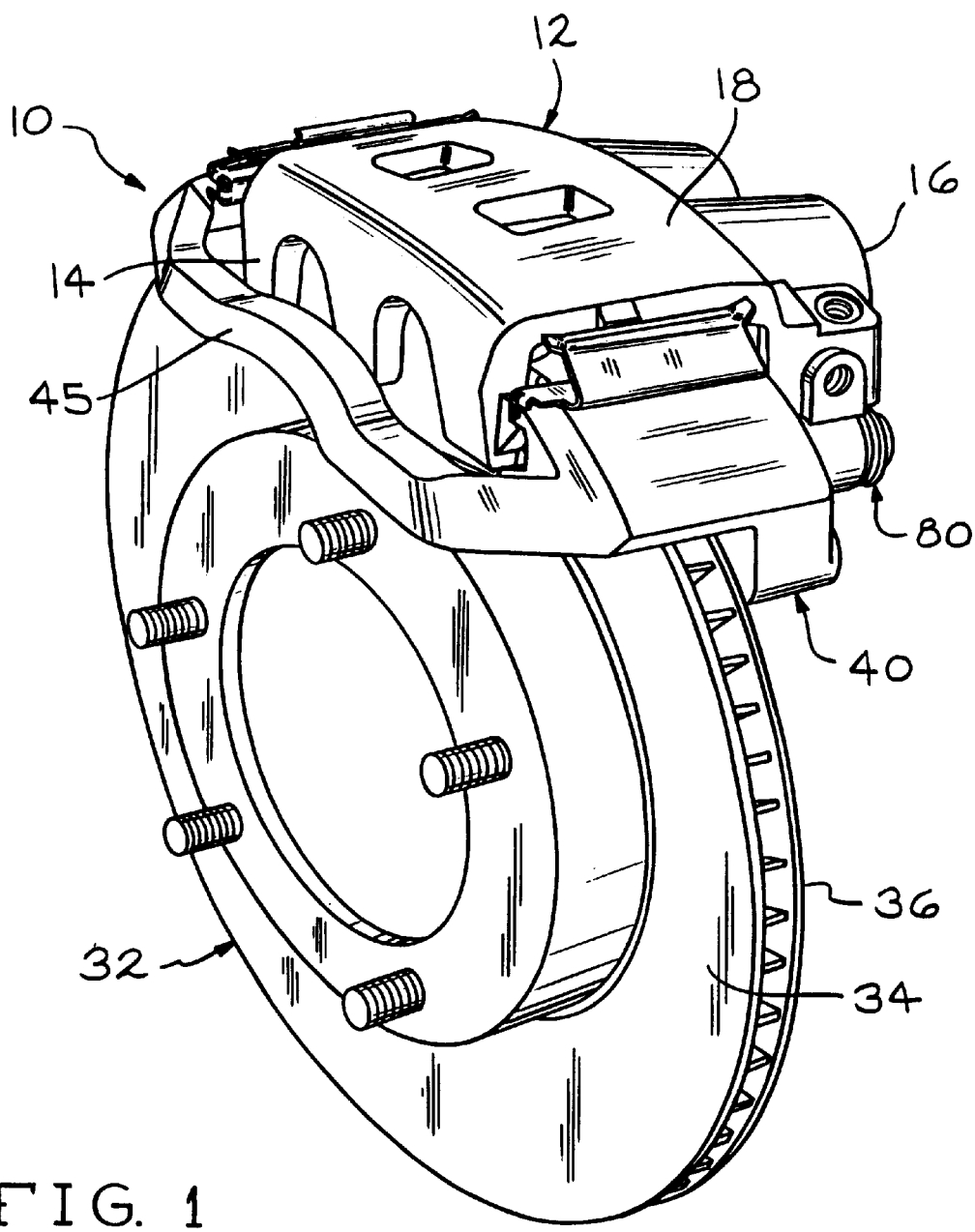
FIG. 1 is a perspective view of a portion of a vehicle disc brake assembly including an improved slide pin bushing in accordance with this invention.

Referring now to the drawings, there is illustrated in FIG. 1 a vehicle disc brake assembly, indicated generally at 10. It should be noted that while the invention is described for use with the particular disc brake structure shown in the drawings, the invention can be used with other disc brake structures. The disc brake assembly 10 includes a generally C-shaped caliper, indicated generally at 12. The caliper 12 includes an outboard leg portion 14 and an inboard leg portion 16 which are interconnected by an intermediate bridge portion 18.

The caliper 12 is slidably supported on a pair of sleeves 82. The sleeves 82 are secured relative to an anchor plate, indicated generally at 40, by a pair of pins, indicated generally at 13. Each of the pins 13 includes a threaded outer end 13A, a non-threaded main body 13B, and a hexagon inner head 13C. The anchor plate 40 is, in turn, secured to a stationary component of the vehicle, such as a steering knuckle (not shown) in a front wheel drive vehicle. The pins 13 extend through respective slide pin bushing assemblies, indicated generally at 80, which are disposed in respective non-threaded apertures 16A formed in the inboard leg 16 of the caliper 12. The threaded ends 13A of the pins 13 are received in threaded apertures 40A provided in anchor plate 40 (only one threaded aperture 40A is shown). The pins 13 and the sleeves 82 support the caliper 12 for sliding movement relative to the anchor plate 40 in both the outboard direction (left when viewing FIG. 3) and the inboard direction (right when viewing FIG. 3). Such sliding movement of the caliper 12 occurs when the disc brake assembly 10 is actuated, as will be explained below. A pair of bolts (not shown) extend through a pair of threaded apertures 40B (only one of the apertures 40B is shown) formed in the anchor plate 40 to secure the anchor plate 40 to the stationary vehicle component.

Figure 3:
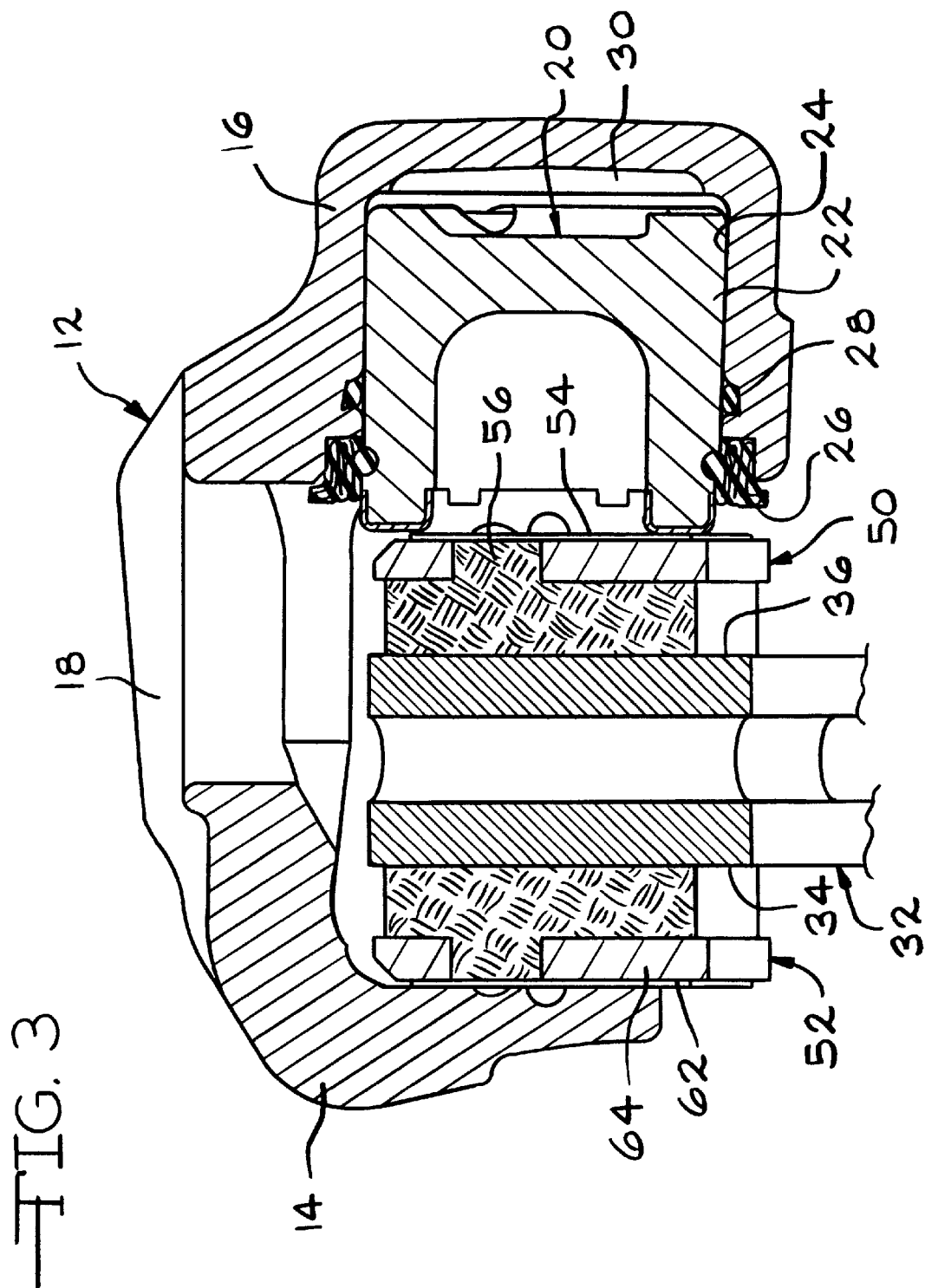
FIG. 3 is a sectional view of a portion of the vehicle disc brake assembly illustrated in FIG. 1.

The inboard caliper leg 16 contains an actuation means, indicated generally at 20 in FIG. 3. The actuation means 20, shown in this embodiment as being a hydraulic actuation means, is operable to reciprocally move a pair of brake pistons 22 (only one piston 22 is shown) within a pair of bores 24 formed in the inboard caliper leg 16. However, other types of actuation means, such as for example, electrical and mechanical types, can be used.

The disc brake assembly 10 further includes a dust boot seal 26 and an annular fluid seal 28. The dust boot seal 26 is intended to prevent most of the elements of weather, i.e., salt, water, and mud, from entering into the bore 24. The annular seal 28 is designed to provide a sealed chamber 30 into which hydraulic fluid may be introduced under pressure so as to actuate the associated piston 22 in an outboard direction toward a brake rotor 32. The brake rotor 32 includes a pair of braking surfaces or faces 34 and 36.

Figure 2:
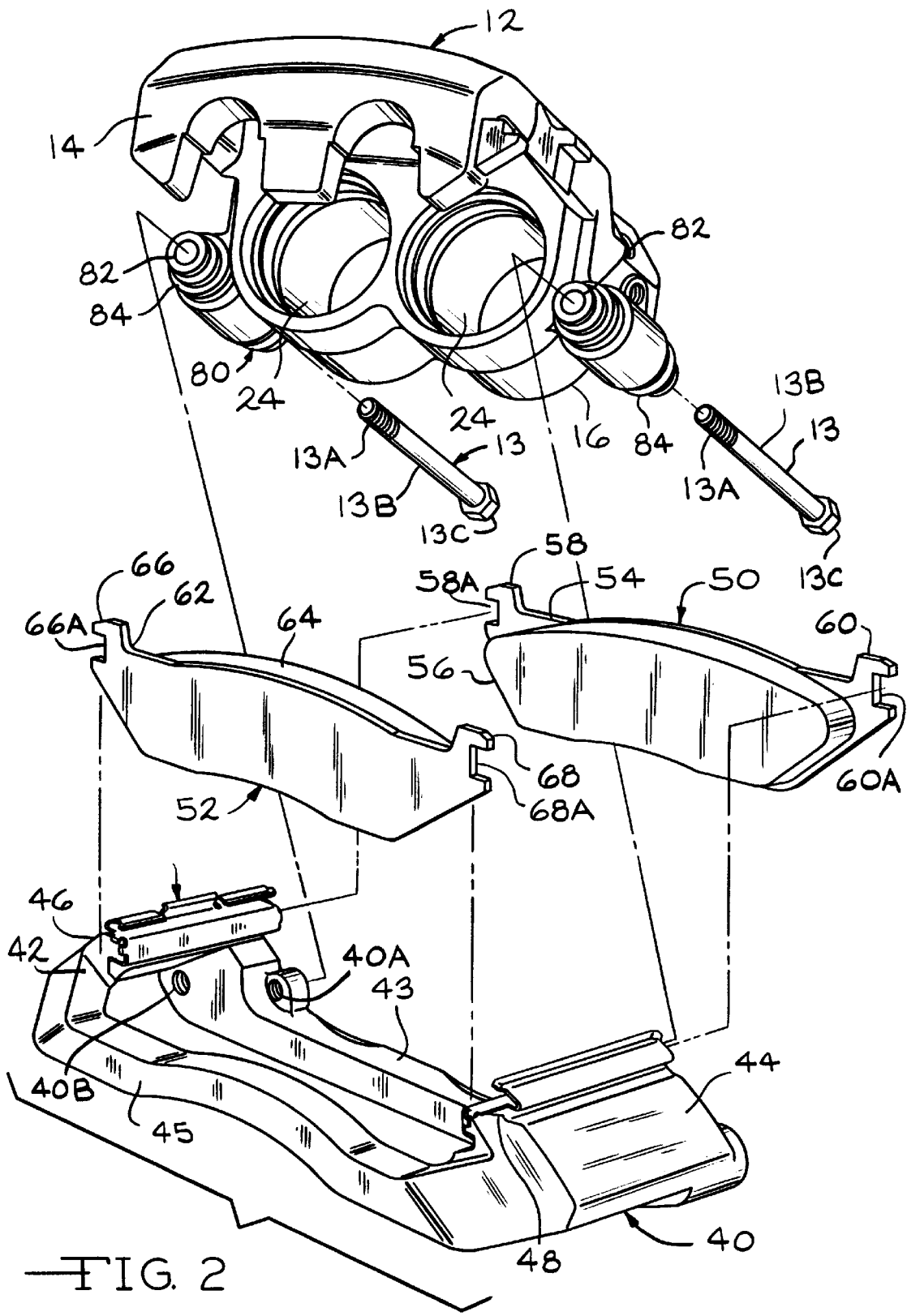
FIG. 2 is an exploded perspective view of selected portions of the vehicle disc brake assembly illustrated in FIG. 1.

As best shown in FIG. 2, the anchor plate 40 includes a pair of axially and outwardly extending arms 42 and 44, an inner tie bar 43, and an outer tie bar 45. The arm 42 includes a guide rail 46, and the arm 44 includes a guide rail 48. The guide rails 46 and 48 slidably support an inboard friction pad 50 and an outboard friction pad 52, respectively, of the disc brake assembly 10. The inboard friction pad 50 includes a backing plate 54 and a friction pad 56. The backing plate 54 includes opposed ends 58 and 60 having notches 58A and 60A respectively formed therein for supporting the friction pad 50 on the guide rails 46 and 48 of the anchor plate 40. The outboard friction pad 52 includes a backing plate 62 and a friction pad 64. The backing plate 62 includes opposed ends 66 and 68 having notches 66A and 68A respectively formed therein for supporting the friction pad 52 on the guide rails 46 and 48 of the anchor plate 40.

When pressurized hydraulic fluid is introduced into the chambers 30, the pistons 22 are caused to slide within the bores 24 in the outboard direction (toward the left in FIG. 3), to engage the backing plate 54 of the inboard friction pad 50. At the same time, the caliper 12 slides on the sleeves 82 in the inboard direction (toward the right in FIG. 3), so that the outboard leg 14 of the caliper 12 engages the backing plate 62 of the outboard friction pad 52. Thus, when pressurized hydraulic fluid is introduced into the chambers 30, the friction pads 56 and 64 are operatively moved toward one another into frictional engagement with the oppositely facing surfaces 34 and 36 of the rotor 32 to cause braking thereof.

Figure 4:
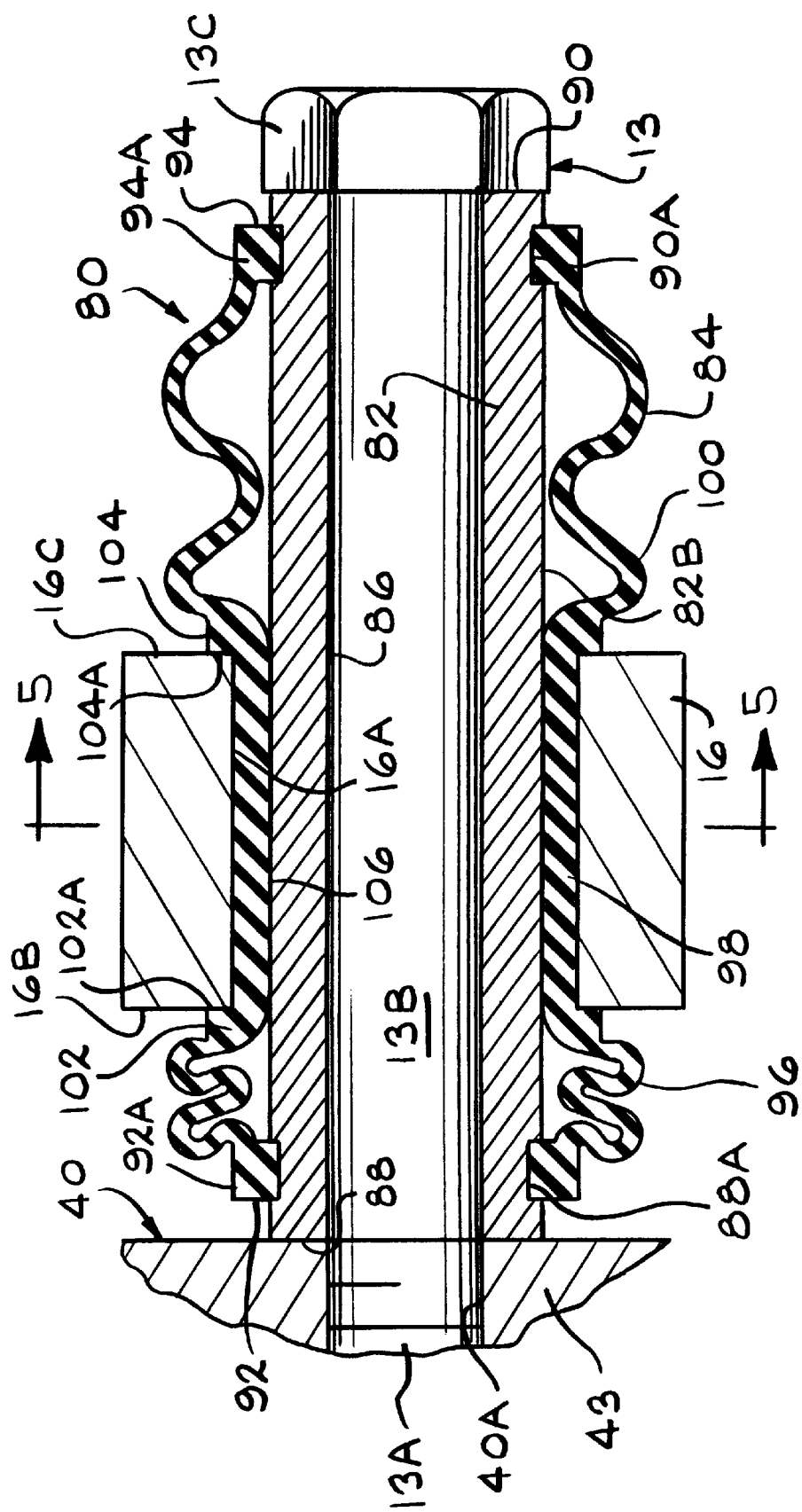
FIG. 4 is a sectional view, partially broken away, of a portion of the vehicle disc brake assembly and showing the slide pin bushing assembly of this invention.

Turning now to FIG. 4, the structure of one of the slide pin bushing assemblies 80 of this invention will be discussed. As shown therein, the slide pin bushing assembly 80 includes a rigid hollow cylindrical sleeve 82 installed within a flexible elastomeric slide pin bushing 84 which, in turn, is installed in the non-threaded opening 16A of the inboard leg 16 of the caliper 12. The sleeve 82 includes an axially extending inner bore 86 formed therethrough. The pin 13 extends through the inner bore of the sleeve 86 such that the threaded end 13A thereof is received in the threaded opening 40A of the anchor plate 40. As a result, the sleeve 82 is secured to the anchor plate 40, and the caliper 12 is supported on the sleeve 82 for sliding movement relative thereto. The sleeve 82 has a pair of annular grooves 88A and 90A formed therein adjacent opposed opened ends 88 and 90, respectively, thereof. Preferably, the sleeve 82 is formed from steel. Alternatively, the sleeve 88 can be formed from other materials if desired. For example, the sleeve 88 can be formed from aluminum, titanium, or a relatively rigid plastic material.

The slide pin bushing 84 is preferably formed from a relative soft flexible elastomeric material such as ethylene propylene diene monomer (EPDM) having a Shore "A" hardness in the range of 50 to 70. Alternatively, the slide pin bushing 84 can be formed from other flexible elastomeric materials if desired. The slide pin bushing 84 is disposed in the non-threaded aperture 16A formed in the inboard leg 16 of the caliper 12 and includes a pair of opposed opened ends 92 and 94. The opened ends 92 and 94 of the slide pin bushing 84 are disposed in the annular grooves 88A and 90A, respectively, of the sleeve 82. To accomplish this, the opened ends 92 and 94 of the slide pin bushing 84 are provided with predetermined shaped flanged ends 92A and 94A, respectively. The flanged ends 92A and 94A have a generally rectangular shaped cross-section and are received in the respective annular grooves 88A and 90A of the sleeve 82 to thereby attach the slide pin bushing 84 to the sleeve 82 and also to prevent debris from entering. Alternatively, the structure of the grooves 88A and 90A of the sleeve 82 and the structure of the flanged ends 92A and 94A of the slide pin bushing 84 or both can be varied if desired.

The slide pin bushing portion 84 is segmented into three sections, namely, an outer end section 96, an intermediate section 98, and an inner end section 100. The outer end section 96 defines an outer boot seal, and the inner end section 100 defines an inner boot seal. The inner boot seal 100 and the outer boot seal 96 are intended to prevent the elements of weather, i.e., salt, water, and mud, from entering into the slide pin busing assembly 80. A plurality of flexible convolutions are provided in the outer end section 96 of the slide pin bushing 84 between the associated opened end 92 and the intermediate section 98 thereof. A plurality of flexible convolutions are also provided in the inner end section 100 of the slide pin bushing 84 between the associated opened end 94 and the intermediate section 98 thereof. Alternatively, one or both of the inner end section 100 and the outer end section 96 can be formed separate from the intermediate section 98.

A generally annular flange 102 is formed at the junction between the outer end section 96 and the intermediate section 98 of the slide pin bushing 84. The flange 102 defines a first slide pin bushing shoulder 102A. A generally annular flange 104 is also formed at the junction between the intermediate section 98 and the inner end section 100 of the slide pin bushing 84. The raised rib 104 defines a second slide pin bushing shoulder 104A. When the slide pin bushing 84 is installed in the non-threaded aperture 16A of the inboard leg 16 of the caliper 12, the first shoulder 102A engages an outer surface 16B of the inboard leg 16 about the aperture 16A and the second shoulder 104A engages an inner surface 16C of the inboard leg 16 about the opposite end of the aperture 16A. Thus, the slide pin bushing shoulders 102A and 104A function to position and secure the intermediate section 98 of the slide pin bushing 84 in the non-threaded aperture 16A of the inboard leg 16 of the caliper 12.

Figure 5:
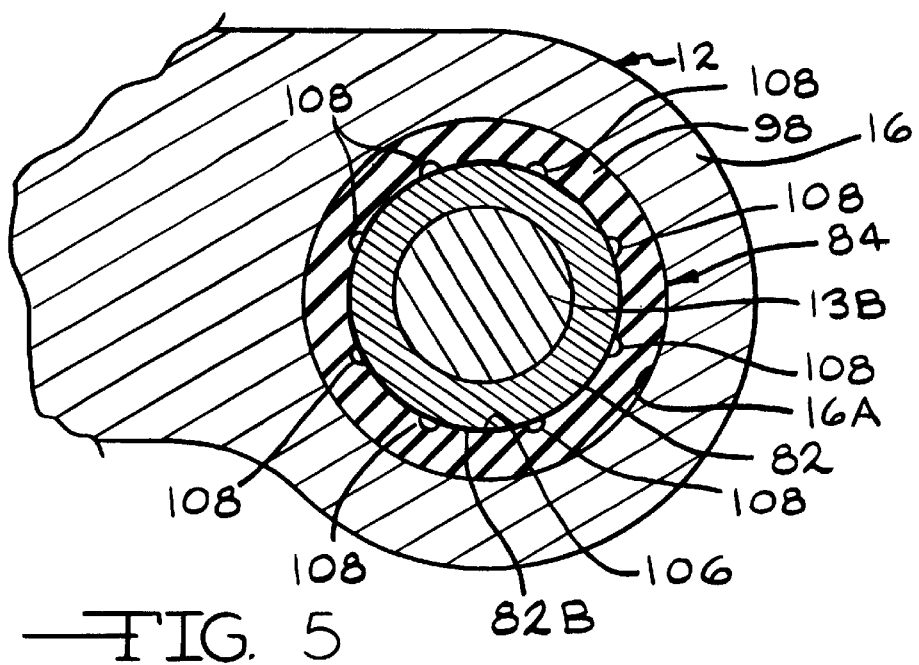
FIG. 5 is a sectional view taken along line 5—5 of FIG. 4.
Figure 6:
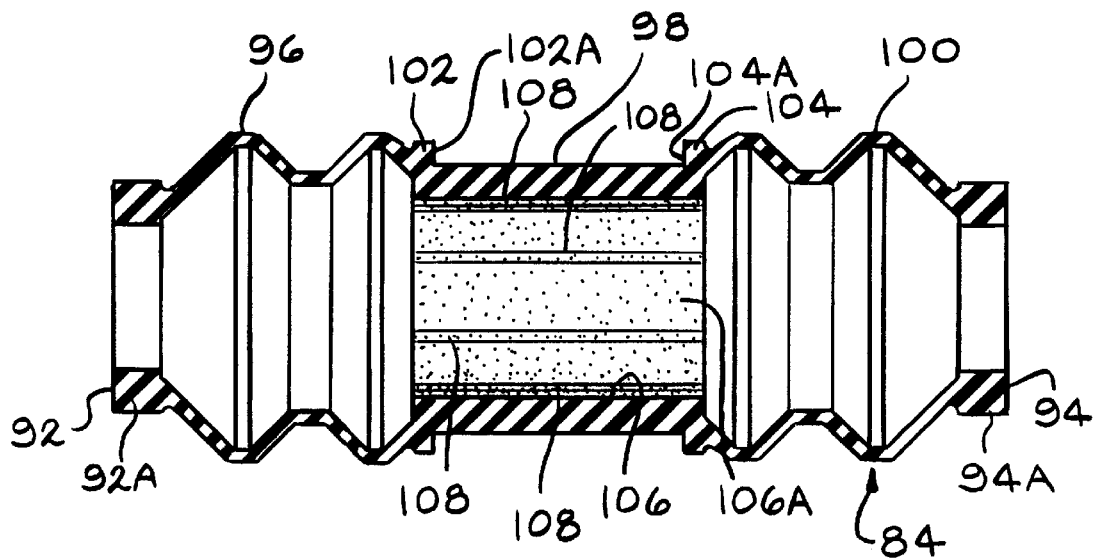
FIG. 6 is a sectional view of the slide pin bushing of this invention.

The intermediate section 98 of the slide pin bushing 84 includes a cylindrical inner surface 106 which engages an outer surface 82B of the sleeve 82. As shown in FIGS. 5 and 6, the cylindrical inner surface 106 of the slide pin bushing 84 is preferably provided with a plurality of longitudinally extending slots 108 formed therein for installation purposes (eight of such slots 108 being shown).

As shown in FIG. 6, the cylindrical inner surface 106 of the slide pin bushing 84 is provided with a generally roughened or textured surface finish 106A. To accomplish this, the slide pin bushing 84 is molded in a mold (not shown) having a roughened or textured surface in a core portion thereof which corresponds to the inner diameter of the cylindrical inner surface 106 of the intermediate section 98 of the slide pin bushing 84. The core portion of the mold can be roughened by a suitable process. For example, the mold can be roughened by grit blasting or etching processes. As will be discussed, the roughened or textured surface finish 106A of the slide pin bushing 84 is provided to reduce the surface contact area between the cylindrical inner surface 106 of the slide pin bushing 84 and the outer surface 82B of the sleeve 82 during sliding movement of the sleeve 82 relative thereto.

The roughened or textured surface 106A of the slide pin bushing 84 resembles a plurality of slight generally rounded depressions provided in the cylindrical inner surface 106 thereof. The depressions extend slightly into the cylindrical inner surface 106 of the slide pin bushing 84 and the depth of the depressions is dependent upon the process used to roughen the core portion of the mold.

One advantage of the slide pin bushing 84 of this invention is that the roughened or textured surface finish 106A of the intermediate section 98 thereof reduces the surface contact area between the cylindrical inner surface 106 of the slide pin bushing 84 and the outer surface 82B of the sleeve 82. As a result, during sliding movement of the sleeve 82 relative to the intermediate section 98 of the slide pin bushing 84, the frictional forces between the outer surface 82B of the sleeve 82 and the cylindrical inner surface 106 of the slide pin bushing 84 are reduced, thereby providing a smoother sliding action of the caliper 12 during actuation of the disc brake assembly 10. Also, the roughened or textured surface finish 106A provides small pockets for grease to be retained therein, also to reduce the frictional forces between the outer surface 82B of the sleeve 82 and the cylindrical inner surface 106 of the slide pin bushing 84 during actuation of the disc brake assembly 10.

Although the invention has been described and illustrated in connection with the particular disc brake assembly structures disclosed herein, it will be appreciated that this invention may be used in connection with other types of disc brake assembly structures. Also, while the slide pin bushing assembly 80 has been described and illustrated as including the sleeve 82 and the slide pin bushing 84, the slide pin bushing assembly 80 can include only the slide pin bushing 84. In this case, the roughened or textured surface finish 106A of the slide pin bushing 84 is effective to reduce the frictional forces between the outer surface of the non-threaded main body 13B of the pin 13 and the cylindrical inner surface 106 of the slide pin bushing 84 during actuation of the disc brake assembly 10.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A disc brake assembly for a vehicle adapted to selectively frictionally engage a rotor connected to a vehicle wheel comprising:

an anchor plate adapted to be secured to a stationary component of the vehicle;

a pin extending from said anchor plate and including an outer surface;

a slide pin bushing disposed about said pin and including an inner surface and an outer surface, said inner surface provided with at least a pair of spaced apart inner contacting surfaces which are spaced apart from one another by a groove said inner contacting surfaces engaging said outer surface of said pin, said inner contacting surfaces of said slide pin bushing having a roughened surface finish defined by a plurality of generally rounded depressions provided therein, said plurality of rounded depressions extending into said inner contacting surfaces of said slide pin bushing;

a caliper having an opening formed therein, said outer surface of said slide pin bushing extending within said opening such that said caliper is supported for sliding movement relative to said anchor plate;

a pair of brake pads carried by said disc brake assembly; and means for selectively moving said brake pads toward and away from one another so as to be adapted to selectively frictionally engage the rotor;

wherein said plurality of rounded depressions formed in said inner contacting surfaces of said slide pin bushing is effective to reduce the surface contact area between said inner contacting surfaces of said slide pin bushing and said outer surface of said pin to thereby reduce the frictional forces therebetween during sliding movement of said caliper and thereby provide a smoother sliding action of said caliper during actuation of the disc brake assembly.

2. The disc brake caliper assembly defined in claim 1 wherein said slide pin bushing includes a pair of opposed ends provided with flanges.

3. The disc brake caliper assembly defined in claim 1 wherein said inner surface of said slide pin bushing is provided with at least one longitudinally extending slot formed therein.

4. The disc brake caliper assembly defined in claim 1 wherein said slide pin bushing includes an outer end section, an intermediate section, and an inner end section, said outer end section including a plurality of flexible convolutions to connect outer end section to said intermediate section, and said inner end section including a plurality of flexible convolutions to connect said inner end section to said intermediate section.

5. The disc brake caliper assembly defined in claim 4 wherein at least one of said outer end section and said inner end section is formed integrally with said intermediate section during a molding process.

6. The disc brake caliper assembly defined in claim 1 wherein said pin includes a threaded outer end and a non-threaded main body, said threaded outer end received in a threaded opening provided in said anchor plate.

7. A disc brake assembly for a vehicle adapted to selectively frictionally engage a rotor connected to a vehicle wheel comprising:

an anchor plate adapted to be secured to a stationary component of the vehicle;

a pin extending from said anchor plate;

a generally rigid sleeve disposed about said pin and including an outer surface;

a slide pin bushing disposed about said sleeve and including an inner surface and an outer surface said inner surface provided with at least a pair of spaced apart inner contacting surfaces which are spaced apart from one another by a groove, said inner contacting surfaces engaging said outer surface of said sleeve, said inner contacting surfaces of said slide pin bushing having a roughened surface finish defined by a plurality of generally rounded depressions provided therein, said plurality of rounded depressions extending into said inner contacting surfaces of said slide pin bushing;

a caliper having an opening formed therein, said outer surface of said slide pin bushing extending within said opening such that said caliper is supported for sliding movement relative to said anchor plate;

a pair of brake pads carried by said disc brake assembly; and means for selectively moving said brake pads toward and away from one another so as to be adapted to selectively frictionally engage the rotor;

wherein said plurality of rounded depressions formed in said inner contacting surfaces of said slide pin bushing is effective to reduce the surface contact area between said inner contacting surfaces of said slide pin bushing and said outer surface of said sleeve to thereby reduce the frictional forces therebetween during sliding movement of said caliper and provide a smoother sliding action of said caliper during actuation of the disc brake assembly.

8. The disc brake caliper assembly defined in claim 7 wherein said slide pin bushing includes a pair of opposed ends provided with flanges.

9. The disc brake caliper assembly defined in claim 7 wherein said inner surface of said slide pin bushing is provided with at least one longitudinally extending slot formed therein.

10. The disc brake caliper assembly defined in claim 7 wherein said slide pin bushing includes an outer end section, an intermediate section, and an inner end section, said outer end section including a plurality of flexible convolutions to connect outer end section to said intermediate section, and said inner end section including a plurality of flexible convolutions to connect said inner end section to said intermediate section.

11. The disc brake caliper assembly defined in claim 10 wherein at least one of said outer end section and said inner end section is formed integrally with said intermediate section during a molding process.

12. The disc brake caliper assembly defined in claim 7 wherein said slide pin bushing includes a pair of flanged ends, said sleeve including a pair of annular grooves formed therein adjacent opposed ends thereof, said flanged ends of said slide pin bushing disposed in said annular grooves of said sleeve to thereby attach said slide pin bushing to said sleeve.

13. The disc brake caliper assembly defined in claim 7 wherein said pin includes a threaded outer end and a non-threaded main body, said threaded outer end received in a threaded opening provided in said anchor plate.

14. A slide pin bushing adapted for use with a disc brake caliper assembly comprising:

a slide pin bushing formed from an elastomeric material, said slide pin bushing including an inner surface and an outer surface, said inner surface provided with at least a pair of spaced apart inner contacting surfaces which are spaced apart from one another by a groove, said inner contacting surfaces of said slide pin bushing having a roughened surface finish defined by a plurality of generally rounded depressions provided therein, said plurality of rounded depressions extending into said inner contacting surfaces of said slide pin bushing.

15. The slide pin bushing defined in claim 14 wherein said slide pin bushing includes a pair of opposed ends provided with flanges.

16. The slide pin bushing defined in claim 14 wherein said inner surface is provided with at least one longitudinally extending slot formed therein.

17. The slide pin bushing defined in claim 14 wherein said slide pin bushing includes an outer end section, an intermediate section, and an inner end section, said outer end section including a plurality of flexible convolutions to connect outer end section to said intermediate section, and said inner end section including a plurality of flexible convolutions to connect said inner end section to said intermediate section.

18. The slide pin bushing defined in claim 17 wherein at least one of said outer end section and said inner end section is formed integrally with said intermediate section during a molding process.

19. The slide pin bushing defined in claim 14 wherein said slide pin bushing is formed from an elastomeric material having a Shore "A" hardness in the range of 50 to 70.

\* \* \* \* \*